(12) United States Patent
Summers et al.

(10) Patent No.: US 6,731,141 B1
(45) Date of Patent: May 4, 2004

(54) LOW SUPPLY VOLTAGE LINE DRIVER

(75) Inventors: Mark Summers, Apex, NC (US); John Mullen, Wake Forest, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/924,280

(22) Filed: Aug. 7, 2001

Related U.S. Application Data
(60) Provisional application No. 60/223,855, filed on Aug. 8, 2000.

(51) Int. Cl.[7] .................................................. H03K 3/00
(52) U.S. Cl. .......................... 327/110; 326/82; 375/258
(58) Field of Search ........................ 327/108–112, 423, 327/424, 448, 508, 588, 587, 574, 576; 326/82, 83; 360/46, 67, 68; 363/58, 63; 375/258

(56) References Cited

U.S. PATENT DOCUMENTS

| | | | | |
|---|---|---|---|---|
| 5,629,641 A | * | 5/1997 | Cheng ........................ 327/108 |
| 5,638,012 A | * | 6/1997 | Hashimoto et al. .......... 327/110 |
| 6,160,436 A | * | 12/2000 | Runaldue ..................... 327/407 |
| 6,175,255 B1 | * | 1/2001 | Mohan ........................ 327/108 |
| 6,236,246 B1 | * | 5/2001 | Leighton et al. ............ 327/110 |

* cited by examiner

Primary Examiner—Minh Nguyen
(74) Attorney, Agent, or Firm—Bobby K. Truong; Hickman Palermo Truong & Becker LLP

(57) ABSTRACT

A line driver provides an output signal onto an output. The line driver includes a first current driver coupled to a first terminal of the output. The first current driver is capable of providing a first current to the first terminal that is sufficient to cause an output voltage having a magnitude Y to appear across the output. The first current driver includes a first plurality of elements to provide the first current to the first terminal of the output, each of the plurality of elements having a maximum voltage tolerance that is less than the magnitude Y.

21 Claims, 1 Drawing Sheet

LOW SUPPLY VOLTAGE LINE DRIVER

PRIORITY APPLICATIONS

This application claims the benefit of priority to provisional U.S. Appl. No. 60/223,855, filed Aug. 8, 2000, naming Mark Summers and John Mullen as inventors. This priority application is incorporated by reference in this application.

FIELD OF THE INVENTION

The present invention relates to mechanisms for driving analog signals across transmission medium. In particular, the present invention relates to a low voltage supply line driver capable of providing relatively high voltage output with a low power supply voltage.

BACKGROUND OF THE INVENTION

Advances in semi-conductors have led to increased speed, lower power consumption, and higher levels of integration in digital circuits. In general, analog circuits have not benefited equally from process advancements due to the inability to utilize minimum size transistors and the reduction in power supply voltages. Successful mixed-signal design in state of the art semi-conductor processes requires efficient, low-voltage analog topologies.

Ethernet systems typically use line drivers as part of a process for converting digital data into an analog signal for a transmission line. One basic line driver topology is referred to as a 10Base-T Ethernet driver. The specification for the 10Base-T Ethernet line driver is defined by the IEEE 802.3 industry standard. One aspect of this specification is that the Ethernet line driver must provide sufficient current to enable an output voltage to be generated at a level of 2.5+/−0.3Vpk.

Typically, Ethernet line drivers use external voltage supplies that are large enough to enable the line drivers to provide the required output voltage levels. But with advancements in semiconductor processing, devices used in line drivers are increasingly becoming smaller. The smaller devices come with smaller voltage tolerances. These devices have limited use in Ethernet line drivers if their voltage tolerances is less than the supply voltage required for generating the required output voltage.

In addition, attempts to use smaller devices in Ethernet line drivers have had difficulty generating necessary output voltage swings required by the industry standard. The voltage swings within the line drivers cannot cause voltage drops to appear across devices that have a smaller voltage tolerance. The small tolerances may cause those devices to breakdown as a result of the voltage swings.

SUMMARY OF THE INVENTION

Embodiments of the invention include a line driver for driving an output signal onto an output having a first terminal and a second terminal. A first current driver is coupled to the first terminal of the output. A power supply having a voltage X is supplied to the first current driver. The first current driver is capable of providing a first current to the first terminal. The first current is sufficient to cause an output voltage having a magnitude Y to appear across the output, where the magnitude Y is greater than the voltage X. The first current driver includes a first plurality of elements to provide the first current. Each of the plurality of elements has a maximum voltage tolerance that is less than the magnitude Y.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
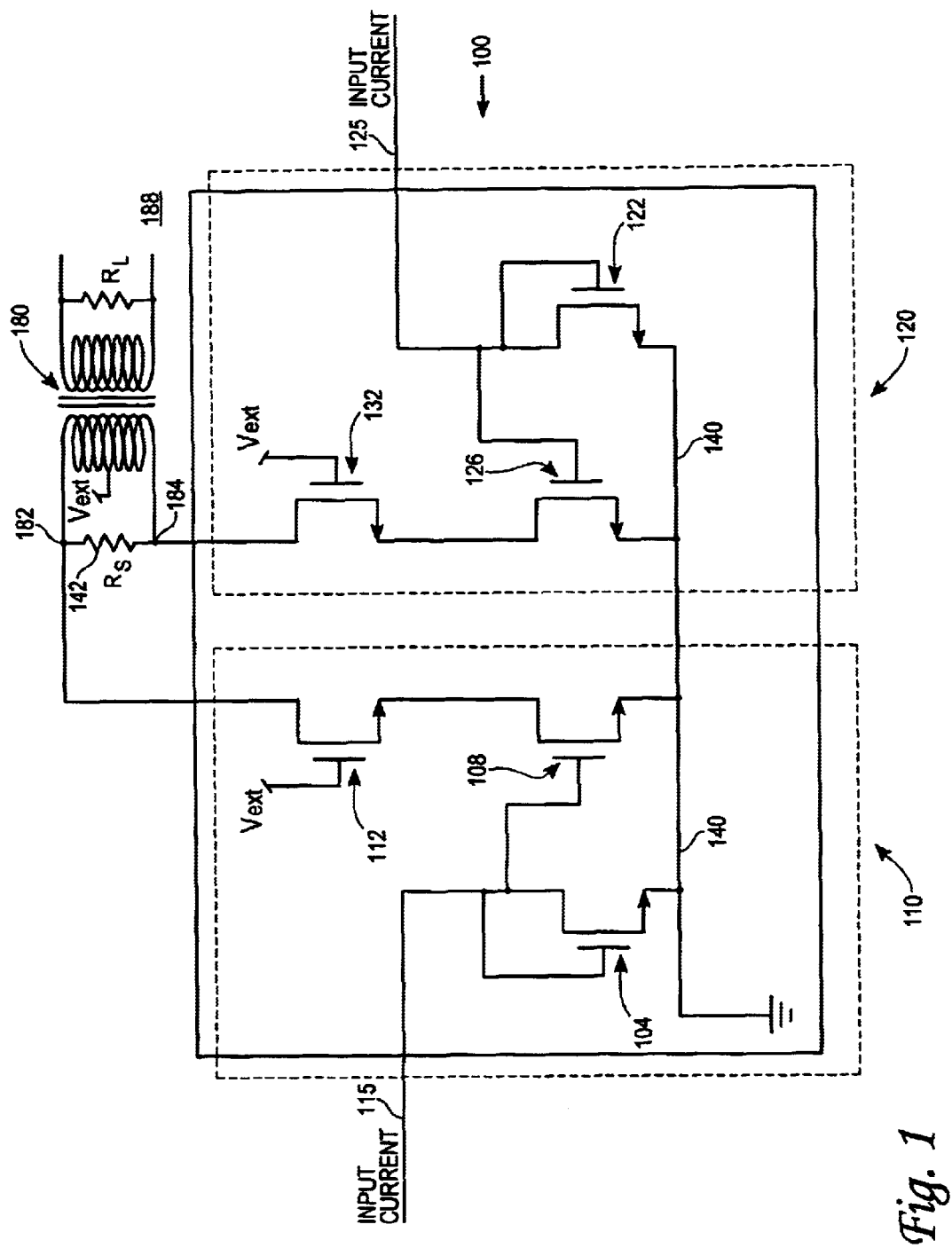
FIG. 1 illustrates a low supply voltage line driver.

A component incorporating a low supply voltage line driver is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

FIG. 1 illustrates a low supply voltage line driver 100. The line driver 100 is a component, such as a microprocessor, having an integrated line driver circuit. The line driver 100 includes components that amplify an input current from a current source. The amplified input current is signaled to one or more terminals of an output, in order to generate a voltage across the output. The output may be used to create a signal on a transmission line 188 using the voltage generated by the amplified current.

In one application, the output corresponds to a transformer 180 having one or more terminals. The line driver 100 signals an output current to terminals of the transformer 180 in order to generate a desired voltage across the transformer. The transformer 180 is coupled to the transmission line 188. A low supply voltage may be provided to components of the line driver 100 from an external power supply.

According to an embodiment, the line driver 100 provides an output current to one or more terminals of transformer 180. The output current is sufficiently large to create a desired voltage level across terminals of transformer 180. The desired voltage level may be 2.5+/−, so as to create a 5 volt differential. The transformer 180 may apply the voltage to generate an analog signal on the transmission medium 188. The line driver 100 uses components having tolerance voltage levels of about 1.8 volts to provide the output current. In one implementation, the line driver 100 conforms to an IEEE 802.3 10Base-T standard.

In an embodiment, line driver 100 includes a first current driver 110 and a second current driver 120. The first current driver 110 may have a positive or negative polarity, and the second current driver 120 may have the opposite polarity. In this way, each current driver 110, 120 may provide an output current to generate about the same magnitude voltage across transformer 180. The voltages caused by current drivers 110, 120 may have opposite polarities and he applied to different terminals 182, 184 of transformer 180, so as to create a peak-to peak voltage differential on the transformer that is the sum of the two voltages caused by current drivers 110, 120. For a 10Base-T configuration, first current driver 110 provides an output current to a first terminal 182 of transformer 180 that is sufficient to create a voltage having a magnitude of about 2.5 volts across transformer 180. The second current driver 120 provides an output current to a second terminal 184 of transformer 180 that is sufficient to create an opposite voltage having a magnitude of about 2.5 volts across transformer 180. The first terminal 182 and second terminal 184 may correspond to a positive and negative terminal respectively, so that the voltage swing across transformer 180 is about 5 volts. As used herein, the terms 'about' and 'approximately' refers to within 90% of the stated value.

Each current driver 110, 120 is connected to a ground 140. The first current driver 110 may receive an input current from a first current source 115. The second current driver 120 may receive an input current from a second current source 125. The current sources 115, 125 may be external or internal to the line driver 100. The input current from first current source 115 may be of a first polarity. The input current from second current source 125 may be of a second polarity.

The first current driver 110 and second current driver 120 each include a plurality of elements or devices that combine to distribute a voltage differential between the ground 140 and a corresponding one of the first terminal 182 or second terminal 184 of transformer 180. For each current driver 110, 120, the plurality of elements amplify the respective input current in order to supply the corresponding output current to first terminal 182 or second terminal 184. The input currents are amplified so that the output current to the first terminal 182 and to the second terminal 184 have sufficient magnitude to create the required voltage differential across transformer 180.

For example, first current source 115 may provide a small positive input current. The plurality of elements of first current driver 110 combine to amplify the input current for first terminal 182. A positive output current signaled from first current driver 110 to first terminal 182 results in a positive voltage being created across transformer 180. The magnitude of the positive voltage is sufficient for creating the output signal on the transmission medium. Furthermore, the voltage differential between the first terminal 182 and ground is distributed amongst the plurality of elements for the first current driver 110.

The plurality of elements may correspond to transistors. In one implementation, the plurality of devices are metal oxide semiconductor field effect transistors (MOSFETs).

According to an embodiment, each of the plurality of devices in first current driver 110 and second current driver 120 have a voltage tolerance that is less than the maximum voltage differential across that current driver. For example, the maximum voltage tolerance of one or more of the plurality of devices may be about 1.8 volts. For a MOSFET element used in one implementation, the 1.8 volt tolerance is the maximum voltage differential that can exist between any terminal pairs of the drain, gate or source terminals, before that device breaks down. In a 10Base-T application, the maximum voltage differential between the first terminal 182 or second terminal 184 and ground 140 is about 2.5 volts. This voltage differential is distributed amongst the plurality of devices in each current driver 110, 120 so that none of the devices experience a voltage drop across that device exceeding 1.8 volts.

In an embodiment, the plurality of devices for first current driver 110 include a first transistor 104, a second transistor 108, and a third transistor 112. The first transistor 104 may correspond to an input transistor that receives the input current from first current source 115. The second transistor 108 may correspond to a current amplification transistor that amplifies the input current. The third transistor 112 may correspond to an output transistor that provides an output current to first terminal 182 of transformer 180.

In one configuration, a drain terminal of first transistor 104 receives the input current from first current source 115. A gate terminal for first transistor 104 is connected to receive the input current supplied to the drain terminal. The source terminal of first transistor 104 is grounded. The gate terminal for second transistor 108 receives the input current from first current source 115. The second transistor 108 is aligned in series with a third transistor 112 to distribute the voltage differential between first terminal 182 and ground 140. The second transistor 108 amplifies the input current.

In an embodiment such as shown by FIG. 1, second transistor 108 is the primary source of current amplification. The second transistor 108 may be larger than first transistor 104, causing the input current passing through the second transistor 108 to be amplified in comparison to the current passing through first transistor 104. In an embodiment, second transistor 108 amplifies the input current five-fold.

The first transistor 104 may combine with second transistor 108 to form a 1:5 current mirror. In this type of configuration, a source terminal of second transistor 108 is grounded. A drain terminal of second transistor 108 is connected to a source terminal of third transistor 112. The third transistor 112 may be the same size as first transistor 104. The drain terminal of third transistor 112 provides the output current to first terminal 182 of transformer 180. A gate terminals of third transistor 112 is tied to an external voltage (Vext), shown in the example to be 1.8 volts.

Vext may be supplied to the center of transformer 180. One or more line termination resistors 142 are provided between first terminal 182 and second terminal 184. The line resistors 142 may be are external to the line driver 100.

Vext is supplied to select components to ensure tolerance voltage levels of the transistors 104, 108 and 112 are not exceeded. By applying Vext to the center of transformer 180, and to the gate terminal of third transistor 112, the voltage drop between the third transistor 112 and the transformer 180 will be less than the tolerance voltage level for that transistor. Similarly, the voltage drop between the gate terminal of the third transistor 112 and the ground 140 will also be less than the tolerance voltage level of that transistor. This ensures the voltage drop across second transistor 108 will also be less than the tolerance voltage for that transistor. In one implementation, the external voltage is the same as the tolerance voltage (1.8 volts) for the third transistor 112. The voltage tolerance for the first transistor 104 and second transistor 108 may also be about 1.8 volts.

In an embodiment, second current driver 120 has a similar configuration as the first current driver 110. The second current driver 120 produces an output current for second terminal 184 of transformer 180. The output current to second terminal 184 may have the opposite polarity as the output current to first terminal 182. The voltage differential created across transformer 180 by the output current to second terminal 184 may also have an opposite polarity as the voltage differential created by the output current to first terminal 182. The magnitude of the voltage differential created by the output currents to first terminal 182 and second terminal 184 may be about the same. The output to positive terminal 182 from first current driver 110, and to negative terminal 184 from second current driver 120, combine to create the total voltage differential needed for driving an analog signal on the transmission line 188.

According to an embodiment, second current driver 120 includes a fourth transistor 122, a fifth transistor 126, and a sixth transistor 132. The fourth transistor 122 may correspond to an input transistor. The fifth transistor 126 may correspond to a current amplification transistor for second current driver 120. The sixth transistor 132 may correspond to an output transistor for the second current driver 120.

The drain and one of the gate terminals of the fourth transistor 122 receive the input current from second current source 125. As with first current driver 110, fourth transistor 122 amplifies the input current five-fold. The fourth transistor combines with fifth transistor 126 to form a 1:5 mirror.

The gate terminal for fifth transistor 126 receives the input current from second current, source 125. The source terminal for fifth transistor 126 is grounded. The fifth transistor 126 and sixth transistor 132 are positioned in series, with the drain terminal of fifth transistor 126 feeding the source terminal of sixth transistor 132. The gate terminals for sixth transistor 132 is supplied Vext. The drain terminal of sixth transistor 132 is supplied to the negative terminal 184 of transformer 180.

As with first current driver 110, Vext is provided to select components to ensure the tolerance levels of the transistors is not exceeded. The gate terminal of sixth transistor 132 is supplied Vext to match the center line voltage of transformer 180. Therefore, the voltage difference between second terminal 184 of transformer 180 and sixth transistor 132 is ensured to be less than the voltage tolerance of sixth transistor 122. This ensures the voltage tolerance of fifth transistor 126 is also not exceeded.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A line driver, comprising:
   a first current driver, coupled to a first terminal of an output which is coupled to a first terminal of a center-tap transformer, the first-current driver capable of providing sufficient current to cause a first maximum output voltage having a magnitude Y to appear at the first terminal of the output, where Y is the magnitude of the first maximum output voltage relative to ground;
   wherein the first current driver comprises a first element and a second element coupled to the first element, the first element comprising a first terminal coupled to receive a voltage having a magnitude X, and a second terminal coupled to the first terminal of the output;
   wherein the first element has a maximum voltage tolerance which is less than Y, and the second element has a maximum voltage tolerance which is less than Y;
   wherein X is greater than zero; and
   wherein X is less than or equal to the maximum voltage tolerance of the first element, and X is less than or equal to the maximum voltage tolerance of the second element.

2. The line driver of claim 1, wherein the first element is a transistor.

3. The line driver of claim 1, wherein X is less than Y.

4. The line driver of claim 3, wherein the difference Y–X is less than or equal to the maximum voltage tolerance of the first element.

5. The line driver of claim 1, wherein the first maximum output voltage is distributed among the first and second elements such that neither element experiences a large enough voltage to suffer breakdown.

6. The line driver of claim 1, wherein the second element performs a current amplification function.

7. The line driver of claim 6, further comprising:
   an input receiving element coupled to receive an input current, the input receiving element providing an indication of the input current to the second element to enable the second element to amplify the input current.

8. The line driver of claim 1, wherein the output further comprises a second terminal which is coupled to a second terminal of the center-tap transformer, and wherein the line driver further comprises:
   a second current driver, coupled to the second terminal of the output, capable of providing sufficient current to cause a second maximum output voltage having a magnitude Z to appear at the second terminal of the output, where Z is the magnitude of the second maximum output voltage relative to ground.

9. The line driver of claim 8, wherein the first and second maximum output voltages have opposite polarities.

10. The line driver of claim 8, wherein Y and Z are substantially equal.

11. The line driver of claim 8, wherein the second current driver comprises a third element and a fourth element coupled to the third element, the third element comprising a first terminal coupled to receive a voltage having a magnitude X, and a second terminal coupled to the second terminal of the output.

12. The line driver of claim 11, wherein the third element is a transistor.

13. The line driver of claim 11, wherein the third element has a maximum voltage tolerance which is less than Z, and the fourth element has a maximum voltage tolerance which is less than Z.

14. The line driver of claim 13, wherein X is less than or equal to the maximum voltage tolerance of the third element, and X is less than or equal to the maximum voltage tolerance of the fourth element.

15. The line driver of claim 14, wherein X is less than Z.

16. The line driver of claim 15, wherein the difference Z–X is less than or equal to the maximum voltage tolerance of the third element.

17. The line driver of claim 11, wherein the second maximum output voltage is distributed among the third and fourth elements such that neither element experiences a large enough voltage to suffer breakdown.

18. The line driver of claim 11, wherein the fourth element performs a current amplification function.

19. The line driver of claim 18, further comprising:
   an input receiving element coupled to receive an input current, the input receiving element providing an indication of the input current to the fourth element to enable the fourth element to amplify the input current.

20. The line driver of claim 1, wherein the center-tap of the transformer is coupled to receive a voltage having a magnitude V.

21. The line driver of claim 20, wherein V is substantially equal to X.

* * * * *